(12) United States Patent
Ha et al.

US009803114B2

(10) Patent No.: US 9,803,114 B2
(45) Date of Patent: Oct. 31, 2017

(54) ACRYLIC ADHESIVE COMPOSITION WITH CONTROLLED MOLECULAR WEIGHT

(71) Applicant: 3M INNOVATIVE PROPERTIES COMPANY, St. Paul, MN (US)

(72) Inventors: Sung-Won Ha, Seoul (KR); Babu N. Gaddam, Woodbury, MN (US); Mark F. Ellis, St. Paul, MN (US); Hae-Seung Lee, Woodbury, MN (US); John R. Jacobsen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/311,224

(22) PCT Filed: May 26, 2015

(86) PCT No.: PCT/US2015/032380
§ 371 (c)(1),
(2) Date: Nov. 15, 2016

(87) PCT Pub. No.: WO2015/183782
PCT Pub. Date: Dec. 3, 2015

(65) Prior Publication Data
US 2017/0081567 A1     Mar. 23, 2017

Related U.S. Application Data

(60) Provisional application No. 62/004,257, filed on May 29, 2014.

(51) Int. Cl.
| | | |
|---|---|---|
| *C08F 2/46* | (2006.01) | |
| *C08F 2/50* | (2006.01) | |
| *C08G 61/04* | (2006.01) | |
| *C09J 133/08* | (2006.01) | |
| *C08F 2/38* | (2006.01) | |
| *C08F 220/18* | (2006.01) | |
| *C09J 4/00* | (2006.01) | |
| *C08F 265/06* | (2006.01) | |
| *C09J 4/06* | (2006.01) | |
| *C09J 151/00* | (2006.01) | |
| *C09J 7/02* | (2006.01) | |
| *C08F 220/06* | (2006.01) | |

(52) U.S. Cl.
CPC .............. *C09J 133/08* (2013.01); *C08F 2/38* (2013.01); *C08F 2/50* (2013.01); *C08F 220/18* (2013.01); *C08F 265/06* (2013.01); *C09J 4/00* (2013.01); *C09J 4/06* (2013.01); *C09J 7/0217* (2013.01); *C09J 151/003* (2013.01); *C08F 220/06* (2013.01); *C08L 2312/00* (2013.01); *C09J 2433/00* (2013.01)

(58) Field of Classification Search
CPC .... C09J 133/08; C09J 2433/00; C09J 7/0217; C09J 151/003; C09J 4/00; C09J 4/06; C08F 220/18; C08F 265/06; C08F 220/06; C08F 2220/1841; C08F 2/50; C08F 2/38; C08F 220/1858
USPC ........................ 522/6, 71, 189, 184, 1; 520/1
See application file for complete search history.

(56) References Cited

U.S. PATENT DOCUMENTS

| | | | |
|---|---|---|---|
| 4,181,752 A | 1/1980 | Martens | |
| 4,329,384 A * | 5/1982 | Vesley | ...................... C08F 2/50 427/177 |
| 4,330,590 A | 5/1982 | Vesley | |
| 4,619,979 A | 10/1986 | Kotnour | |
| 4,843,134 A | 6/1989 | Kotnour | |
| 5,506,279 A | 4/1996 | Babu | |
| 5,602,221 A | 2/1997 | Bennett | |
| 5,637,646 A | 6/1997 | Ellis | |
| 5,773,485 A | 6/1998 | Bennett | |
| 5,804,610 A | 9/1998 | Hamer | |
| 5,902,836 A | 5/1999 | Bennett | |
| 6,235,922 B1 | 5/2001 | Robl | |
| 6,448,339 B1 | 9/2002 | Tomita | |
| 6,657,011 B2 | 12/2003 | Lau | |
| 6,783,850 B2 | 8/2004 | Takizawa | |
| 6,939,911 B2 | 9/2005 | Tosaki | |
| 2001/0028953 A1* | 10/2001 | Bluem | ...................... C09J 4/00 428/355 AC |
| 2004/0202879 A1 | 10/2004 | Xia | |
| 2009/0326155 A1* | 12/2009 | Tomita | ............... C08G 18/6229 525/228 |

(Continued)

FOREIGN PATENT DOCUMENTS

| | | |
|---|---|---|
| EP | 2551102 | 1/2013 |
| WO | WO 2000-04079 | 1/2000 |

(Continued)

OTHER PUBLICATIONS

O'Brien, "Facile, versatile and cost effective route to branched vinyl polymers", Polymer, 2000, vol. 41, pp. 6027-6031.
Wakabayashi, "Studies on s-Triazines. I. Cotrimerization of Trichloroacetonitrile with Other Nitriles", Bulletin of the Chemical Society of Japan, 1969, vol. 42, No. 10, pp. 2924-2930.
International Search Report for PCT International Application No. PCT/US2015/032380, dated Jul. 6, 2015, 4 pages.

Primary Examiner — Jessica Whiteley
(74) Attorney, Agent, or Firm — Kent S. Kokko

(57) ABSTRACT

A method for preparing an acrylate adhesive is provided by the steps of partially polymerizing a monomer mixture to provide a syrup polymer composition having a high molecular weight solute copolymer. This first syrup composition is again polymerized to provide a second syrup polymer composition having a low molecular weight copolymer. The second syrup polymer composition is provided with a cross-linking agent and further polymerized to provide the adhesive composition.

19 Claims, No Drawings

(56) References Cited

U.S. PATENT DOCUMENTS

2014/0039083 A1* 2/2014 Krepski ................ C09J 133/06
522/16

FOREIGN PATENT DOCUMENTS

| WO | WO 2009-102623 | 8/2009 |
| WO | WO 2012/148608 | 11/2012 |
| WO | WO 2013-074446 | 5/2013 |
| WO | WO 2014-186265 | 11/2014 |
| WO | WO 2015-143649 | 10/2015 |
| WO | WO 2015-183782 | 12/2015 |
| WO | WO 2016-089805 | 6/2016 |

* cited by examiner

ACRYLIC ADHESIVE COMPOSITION WITH CONTROLLED MOLECULAR WEIGHT

CROSS REFERENCE TO RELATED APPLICATIONS

This application is a national stage filing under 35 U.S.C. 371 of PCT/US2015/032380, filed May 26, 2015, which claims the benefit of U.S. Application No. 62/004,257, filed May 29, 2014, the disclosure of which is incorporated by reference in its/their entirety herein.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, adhesives are known to possess properties including the following: (1) adherence with no more than finger pressure, (2) sufficient ability to hold onto an adherend, and (3) sufficient cohesive strength to be removed cleanly from the adherend. Materials that have been found to function well as adhesives include polymers designed and formulated to exhibit the requisite viscoelastic properties resulting in a desired balance of tack, peel adhesion, and shear holding power.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize an adhesive.

Acrylic adhesives are known to provide good performance, however efforts have been made to increase the molecular weight in an effort to improve the cohesive strength. However, an increase in the molecular weight reduces the tack of the adhesive.

SUMMARY

The present disclosure provides novel adhesive compositions comprising a mixture of a high molecular weight (meth)acrylic copolymer, a low molecular weight (meth)acrylic copolymer, a crosslinked (meth)acrylic copolymer.

The present disclosure further provides a novel syrup polymer composition compositions comprising a mixture of a high molecular weight (meth)acrylic solute copolymer, a low molecular weight (meth)acrylic solute copolymer, a crosslinking agent and (meth)acrylic solvent monomers, which when photopolymerized produce the adhesive composition.

The adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz. The adhesives provide the improvement in cohesive strength without sacrificing the tack.

In one method, high and low $M_w$ (meth)acrylate copolymers may be prepared, combined with solvent (meth)acrylate monomers, a crosslinking agent and photoinitiator, then photopolymerized to produce (meth)acrylate adhesive compositions.

This disclosure further provides a method of making the acrylic adhesive which comprises partially polymerizing a monomer mixture to provide a syrup polymer composition having a high molecular weight solute copolymer. This first syrup composition is again polymerized to provide a second syrup polymer composition having a low molecular weight copolymer. The second syrup polymer composition is provided with a crosslinking agent and further polymerized to provide the adhesive composition.

The present disclosure also provides pressure-sensitive adhesives prepared from the crosslinkable compositions (e.g., syrup compositions) described herein, as well as pressure-sensitive adhesive articles that include, for example, a coating of such adhesive. The pressure-sensitive adhesives, the crosslinked compositions, of this disclosure provide the desired balance of tack, peel adhesion, and shear holding power, and further conform to the Dahlquist criteria, i.e., the modulus of the adhesive at the application temperature, typically room temperature, is less than $3 \times 10^6$ dynes/cm at a frequency of 1 Hz.

In this application "pre-adhesive" refers to the syrup polymer composition comprising a low $M_w$ solute copolymer, a high $M_w$ solute copolymer, a monomer mixture and a crosslinking agent. The pre-adhesive may be crosslinked to form a pressure-sensitive adhesive.

"Syrup composition" refers to a solution of solute copolymer(s) in one or more solvent monomers, the composition having a viscosity of from 500 to 20,000 cPs at 22° C.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

The term "heterohydrocarbyl" means a saturated or unsaturated linear, branched, cyclic, or polycyclic hydrocarbon group (unless otherwise indicated, typically containing up to 30 carbon atoms) having at least one catenary carbon atom (i.e. in-chain) replaced by a catenary heteroatom such as O, S, or N.

The term "(hetero)hydrocarbyl" includes both hydrocarbyl and heterohydrocarbyl.

The term "alicyclic group" means a cyclic hydrocarbon group having properties resembling those of aliphatic groups. The term "aromatic group" or "aryl group" means a mono- or polynuclear aromatic hydrocarbon group.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

DETAILED DESCRIPTION

The present disclosure provides a pre-adhesive composition comprising a syrup polymer composition comprising a low $M_w$ solute copolymer, a high $M_w$ solute copolymer, a monomer mixture and a crosslinking agent. The pre-adhesive may be crosslinked to form a pressure-sensitive adhesive.

In one embodiment, a syrup may be prepared comprising a high $M_w$ solute copolymer having a $M_w$ of 300,000 to 3,000,000, a low $M_w$ solute copolymer having a $M_w$ of 300-300,000, solvent monomer, crosslinking agent, optional tackifier and a photoinitiator, which may then be photopolymerized to produce a (meth)acrylate adhesive polymer. The two solute polymers may be separately prepared and combined. Generally, the syrup polymer composition comprises 5 to 40 parts by weight of the high $M_w$ solute polymer, 0.1 to 25 parts by weight of the low $M_w$ solute copolymer, 0.1 to 5 parts by weight of crosslinking agent, the total being 100 parts by weight. The $M_w$ of the third polymer resulting from polymerization of the remaining syrup monomers is of intermediate $M_w$ of about 100,000 to 1,000,000.

Alternatively, the adhesive may be prepared by the steps of:
a) partially polymerizing a (meth)acrylate monomer mixture to a conversion of 0.1 to 25% to produce a first syrup copolymer comprising a high $M_w$ solute copolymer having a $M_w$ of 300,000 to 3,000,000, and unreacted solvent monomer,
b) adding a chain transfer agent and an initiator to the first syrup and partially polymerizing to a conversion of 5 to 40% to produce a second syrup polymer comprising the high $M_w$ solute copolymer, a low $M_w$ solute copolymer having a $M_w$ of 300-300,000, and unreacted solvent monomer;
c) quenching the chain transfer agent and adding to the second syrup copolymer a compound to, a crosslinking agent, a photoinitiator and an optional tackifier to produce the pre-adhesive composition; and
d) photopolymerizing the mixture to produce a crosslinked adhesive copolymer.

Generally, the product of step c) is coated on a substrate prior to fully polymerizing the syrup in step d).

It will be understood that a syrup polymerization method will produce a "dead polymer" in the initial free radical polymerization; i.e. a fully polymerized, not free-radically polymerizable polymer. The syrup method provides advantages over solvent or solution polymerization methods; the syrup method yielding higher molecular weights. These higher molecular weights increase the amount of chain entanglements, thus increasing cohesive strength. Subsequently the solvent monomers do not free-radically polymerize onto the extant solute copolymer.

The product will be a crosslinked mixture of the high- and low $M_w$ polymers, and a third polymer having a $M_w$ of 100,000 to 1,000,000 produced in the last polymerization step. If a multiacrylate is used as the crosslinking agent used, only the third polymer may be crosslinked. If a halotriazine or hydrogen-abstraction type crosslinking agent is used, then the high $M_w$ polymer will also be crosslinked, and the low $M_w$ polymer may be crosslinked as well.

As a chain transfer step may be added to produce the low $M_w$ solute polymer, it may be necessary to quench residual chain transfer agent prior to step b) by volatilization, oxidation, or by reaction with a sacrificial olefin such as a multifunctional acrylate, allyl acrylate or a polymerizable photoinitiator.

The monomer mixture for the methods includes (meth)acrylate ester monomers, acid-functional monomers, and optionally non-acid functional polar monomers. Generally, the monomers are chosen such the resulting (co)polymers have a $T_g \leq 20°$ C., preferably $\leq 0°$ C., as estimated by the Fox equation.

The crosslinking agent may be a multifunctional (meth)acrylate such as hexanediol diacrylate, a halotriazine or a hydrogen-abstraction crosslinking agent, as described herein.

In the polymerization step used to form the high $M_w$ solute polymer, a thermal or preferably a photoinitiator may be used. Further, the chain transfer agent is generally a thiol chain transfer agent that is quenched so as not to affect the final photopolymerization step d).

In each of the methods, higher degrees of conversion may be used, and additional solvent monomer may be added.

The (meth)acrylate ester monomer useful in preparing the monomer mixture is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, cyclohexanol, 3-heptanol, 1-octanol, 2-octanol, isooctylalcohol, 2-phenylethanol, 2-ethyl-1-hexanol, 1-decanol, 2-propylheptanol, (iso)borneol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable source, such as 2-octanol, citronellol, dihydrocitronellol.

In some embodiments it is desirable for the ultimate copolymer to include a low $T_g$ monomer. Suitable low $T_g$ monomers include have one ethylenically unsaturated group and a glass transition temperature of less than 0° C. (as estimated by the Fox Equation), which are suitable in the present invention include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfurylacrylate, ethoxy-ethoxyethyl acrylate and ethoxylated-nonylacrylate. Especially preferred are 2-ethylhexylacrylate, ethoxy-ethoxyethyl acrylate, tridecylacrylate and ethoxylated nonylacrylate.

In some embodiments it is desirable for the ultimate copolymer to include a high $T_g$ monomer, have a $T_g$ of at least 25° C., and preferably at least 50° C. Suitable high $T_g$ monomers include. Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of 50 to 99.9 parts by weight based on 100 parts total monomer content used to prepare the copolymer. Preferably (meth)acrylate ester monomer is present in an amount of 70 to 99 parts by weight, most preferably 80 to 95 parts by weight, based on 100 parts total monomer content. In some embodiments the copolymers may comprise 100% (meth)acrylate ester monomers if selected such that the resulting polymer has the desired $T_g$, as estimated by the Fox equation.

The (meth)acryloyl copolymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.1 to 15 parts by weight, preferably 1 to 10 parts by weight, based on 100 parts by weight total monomer.

The polar monomers useful in preparing the copolymer are both somewhat oil soluble and water soluble. As used herein the term "polar monomers" are exclusive of acid functional monomers.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 40 parts by weight, preferably 0.5 to 30 parts by weight, based on 100 parts by weight total monomer.

The monomer mixture may further include other vinyl monomers. When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

Step a)

In the first polymerization step of the method, an initiator is added to the monomer mixture and polymerized to a conversion rate of 0.1 to 25% to produce a copolymer having a $M_w$ of 300,000 to 3,000,000, preferably to a $M_w$ of 1,000,000 to 2,000,000. By conversion rate, it refers to the wt. % of the monomers is polymerized. The degree of conversion of the monomer mixture to the syrup polymer can be monitored during the irradiation by measuring the index of refraction of the polymerizing medium.

The high- and low $M_w$ copolymers herein may also be prepared by any conventional free radical polymerization method, including solution, radiation, bulk, dispersion, emulsion, and suspension processes. The resulting adhesive (co)polymers may be random or block (co)polymers. The monomer mixture comprises a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In a typical photopolymerization method, a monomer mixture may be irradiated with ultraviolet (UV) rays in the presence of a photopolymerization initiator (i.e., photoinitiators).

The free-radical photoinitiators which are suitable preferably include both type I and preferably type II photoinitiators.

Type I photoinitiators are defined to essentially undergo a unimolecular bond cleavage reaction upon irradiation thereby yielding free-radicals. Suitable type I photoinitiators are selected from a group consisting of benzoin ethers, benzil ketals, α-dialkoxyacetophenones, α-hydroxyalkylphenones and acylphosphine oxides. Suitable type I photoinitiators are commercially available, for example, as Esacure™ KIP 100 from Lamberti Spa, Gallarate, Italy, or as Irgacure™ 651 from Ciba-Geigy, Lautertal, Germany.

Type II photoinitiators are defined to essentially undergo a bimolecular reaction where the photoinitiators interact in an excited state with a second compound acting as co-initiator, to generate free-radicals. Suitable type II photoinitiators are selected from a group comprising benzophenones, thioxanthones and titanocenes. Suitable co-initiators are preferably selected from a group comprising amine functional monomers, oligomers or polymers whereby amino functional monomers and oligomers are preferred. Both primary, secondary and tertiary amines can be used whereby tertiary amines are preferred. Suitable type II photoinitiators are commercially available, for example, as Esacure™ TZT from Lamberti Spa., Gallarate, Italy, or as 2- or 3-methylbenzophenone from Aldrich Co., Milwaukee, Wis. Suitable amine co-initiators are commercially available, for example, as GENOMER™ 5275 from Rahn A G, Zurich, Switzerland.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers.

Water-soluble and oil-soluble initiators useful in preparing the polymers used in the present invention are initiators that, on exposure to heat, generate free-radicals which initiate (co)polymerization of the monomer mixture. Water-soluble initiators are preferred for preparing the (meth) acrylate polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis (4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)).

Initiators may comprise from about 0.001 to 0.1 parts by weight, preferably about 0.01 to 0.1 parts by weight based on 100 parts by weight of monomer components in the pressure-sensitive adhesive. The amount of initiator will depend, in part on the reactivity of the monomers, and whether a high $M_w$ or low $M_w$ polymer is being prepared. Low $M_w$ polymers will require higher amounts of initiator. However, because of the very small amounts of thermal initiators, and the long reaction times required to prepare the high $M_w$ copolymer, it is preferred to use a photopolymerization method.

The product of the first polymerization step of Method II is a first syrup polymer composition comprising 0.1 to 20% of the high copolymer and unreacted monomers. It will be understood that a syrup polymerization method will produce a "dead polymer" in the initial free radical polymerization; i.e. a fully polymerized, not free-radically polymerizable polymer. The syrup method provides advantages over solvent or solution polymerization methods; the syrup method yielding higher molecular weights. These higher molecular weights increase the amount of chain entanglements, thus increasing cohesive strength. Subsequently the solvent monomers do not free-radically polymerize onto the extant solute copolymer.

Step b)

In the second polymerization step of the method the syrup polymer composition is provided with a low $M_w$ copolymer. The first syrup from step a) is provided with a chain transfer agent and an initiator and polymerized to produce a second syrup polymer composition comprising a low $M_w$ solute copolymer, the high $M_w$ solute copolymer from step a and unreacted monomers. The initiator may be a thermal- or photoinitiator as described from step a) and is preferably a thermal initiator as it lowers the residual CTA after the reaction compared to photopolymerization.

The degree of conversion of the monomers to produce the low $M_w$ polymer can be 0.1-30%, preferably 5-20%. The $M_w$ of the second solute low $M_w$ copolymer is from 300-300,000, preferably 1,000 to 100,000. In general, if the $M_w$ of low $M_w$ copolymer is above about 200,000, then the degree of conversion of monomer is generally 20-30%.

However the degree of conversion is also a function of the $M_w$ of low $M_w$ polymer, amount of low $M_w$ polymer (as a function of the degree of conversion), the $T_g$ (modulus) of total PSA composition (as estimated by the Fox equation), amount of crosslinker, and types of crosslinker (triazine, benzophenone or multifunctional acrylate), and the desired adhesive performance. For example, if the low $M_w$ polymer has a $M_w$ of ~40,000, then the maximum amount of the low $M_w$ polymer in the adhesive is about 15% at a certain level of crosslinker (e.g. 0.1 pph of XL-330). If high performance in cohesion is not required, more than 15% conversion may be used. If the $M_w$ of low $M_w$ polymer is 100,000, then greater than 15% conversion (20-25%) may be used. If the $M_w$ of low $M_w$ polymer decreases to ~3,000, the amount of conversion system should be decreased to 7-12% at a certain level of crosslinker (e.g. 0.1 pph of XL-330). However, one may still use 15% of low $M_w$ polymer with $M_w$ of 3,000, if one increased the amount of crosslinker.

A thiol chain transfer agent may added to the monomer mixture or syrup polymer composition to reduce the molecular weight of the solute copolymer in the syrup polymer composition. The preferred chain transfer agents are isooctylthioglycolate or ethylhexyl mercaptopropionate. In some embodiments, the thiol chain transfer agent is volatile, so that the agent may be quenched by heating the syrup polymer composition.

In some embodiments, certain tackifiers having chain transfer activity, such as rosin esters, may be used in lieu of thiol chain transfer agents. In some embodiments, certain solvents have chain transfer activity, such as isopropanol may be used.

The chain transfer agent may be used in amounts such that the low $M_w$ copolymer has a $M_w$ of less than 300,000, and preferable less than 100,000. The monomer mixture may further comprise up to about 5 parts by weight of a chain transfer agent, typically about 0.05 to about 3 parts by weight, if used, preferably about 0.15 parts by weight to about 2 parts by weight, based upon 100 parts by weight of the total monomer mixture.

When using a chain transfer agent, the syrup polymer composition is generally polymerized to higher conversions, than in the absence of chain transfer agents. The conversions may be as high as 35 wt. %, but is generally up to about 25 wt. %. This results in copolymers having generally lower molecular weights. The low $M_w$ copolymer resulting from thermal polymerization in the presence of a chain transfer agent is a dead copolymer, and does not copolymerize with additional monomer in the final polymerization step.

The syrup polymer compositions may be treated to quench any remaining chain transfer agent. In general, when a chain transfer agent is used to produce the low $M_w$ copolymer, the chain transfer agent must be quenched to allow the preparation of the high $M_w$ copolymer. By quench is meant rendered inactive so as not to further limit the $M_w$ of the subsequent polymers, whether by reaction, oxidation of volatilization.

In some embodiments, a branching agent may be used to quench the chain transfer agent. Branching can be achieved through the use of multifunctional monomers in quantities not sufficient to give fully crosslinked. While the use of such monomers would typically lead to crosslinked polymers, the use of such monomers in low concentration can quench the chain transfer agents and lead to highly branched polymers of sufficient high $M_w$. Branching can also be effected by the use of a polymerizable photoinitiator that undergo alpha cleavage, such as VAZPIA. Reference may be made to Sherrington et al. *Facile, versatile and cost effective route to branched polymers*, Polymer 41 (2000) 6027-31.

Branching agents may include monomers have two or more ethylenically unsaturated groups of unequal activity such as alkenyl(meth)acrylates such as allyl(meth)acrylate, crotyl(meth)acrylate, 1-hexenyl(meth)acrtlate, undecenoyl (meth)acrylate, allyloxyphenyl(meth)acrylate, 2-allyloxyethyl(meth)acrylate and the like. The preferred branching agent is allyloxy(meth)acrylate.

Branching agents may also include multifunctional ethylenically unsaturated monomers. Examples of such multifunctional ethylenically unsaturated monomers include, for example, multifunctional (meth)acrylate monomers. Multifunctional (meth)acrylates include tri(meth)acrylates and di(meth)acrylates (that is, compounds comprising three or two (meth)acrylate groups). Typically di(meth)acrylate monomers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris(2-hydroxy ethyl)isocyanurate triacrylate, and pentaerythritol triacrylate. Useful di(meth) acrylates include, for example, ethylene glycol di(meth) acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth) acrylate, alkoxylated 1,6-hexanediol diacrylate, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth) acrylates, and urethane di(meth)acrylates. The branching agent 1,6-hexanediol diacrylate (HDDA) is particularly suitable. Typically the di(meth)acrylate branching agent is used in amounts ranging from 0.001 to 0.05 parts by weight per 100 parts by weight of (meth)acrylate monomers.

In some embodiments, the syrup polymer composition may be with a sacrificial olefin which will undergo a thiol-ene reaction. Useful CTA quenching agents include allyl compounds, including allyl ethers, esters and amines. In some preferred embodiments, the quenching agent include an allyl group to undergo a thiol-ene reaction with residual chain transfer agent, and a second polymerizable group, such as a vinyl group or a (meth)acryloyl group. In such cases the thiol CTA undergoes an ene reaction with the allyl groups, and the product thereof may be polymerized into the polymer chain of the final polymerization step. Alternatively, the thiol chain transfer agent may be treated with an oxidant.

In the methods, the syrup polymer composition is further compounded with a crosslinking agent, typically a photosensitive crosslinking agent. The crosslinking agents are generally halomethyl triazines, hydrogen-abstraction crosslinking agent or multifunctional acrylates.

The halomethyl-1,3,5-triazine crosslinking agents are found to be highly efficient and reliable UV crosslinkers. They are oxygen tolerant, have scavenging ability, and have been found to cure the instant compositions under low intensity light irradiation. Without being bound by theory, it is believed that the halomethyl triazine crosslinking agent functions by hydrogen abstraction of the copolymer followed by radical-radical coupling. Alternatively, the halomethyl-1,3,5-triazine per se may function as a crosslinking agent, whereby a halomethyl radical is generated, which may abstract a proton from the copolymer, or couple with a radical on the copolymer. The result may be a crosslinked acrylate copolymer of the general structure:
Acrylate copolymer —$CX_2$-Triazine-$CX_2$-Acrylte copolymer, where X is halogen as described below.

As the hydrogen abstraction is non-selective, the halomethyl triazine will crosslink the first high $M_w$ copolymer, the second low $M_w$ copolymer, and the copolymer resulting from the remaining monomers of the second syrup composition.

The halomethyl-1,3,5-triazine is of the general formula:

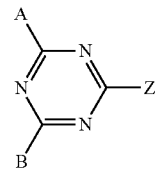

III wherein
A is a mono-, di-, or trihalomethyl, preferably trichloromethyl;
B is A, —$N(R^1)_2$, —$OR^1$, $R^1$, L-$R^{sensitizer}$ or -L-$R^{P1}$, where $R^1$ is H, or preferably alkyl or aryl;
Z is a conjugated chromophore, L-$R^{sensitizer}$ or -L-$R^{P1}$,
L is a covalent bond or a (hetero)hydrocarbyl linking group. Preferably, A and B are trihalomethyl, more preferably trichloromethyl.

In one embodiment, the halomethyl-1,3,5-triazine is as described in U.S. Pat. No. 4,330,590 (Vesley), and is of the formula:

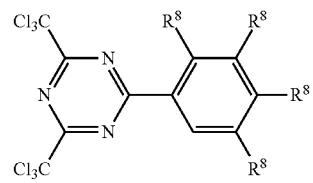

wherein: each $R^8$ is independently hydrogen, alkyl, or alkoxy; and 1-3 of the $R^8$ groups are hydrogen. Preferably, the alkyl and alkoxy groups have no more than 12 carbon atoms, and often no more than 4 carbon atoms. Preferably, one or two of the meta- and/or para-$R^8$ groups are alkoxy, because this tends to provide shorter reaction times. Adjacent alkoxy substituents may be interconnected to form a ring. The triazine component may be prepared by the co-trimerization of an aryl nitrile with trichloroacetonitrile in the presence of HCl gas and a Lewis acid such as $AlCl_3$, $AlBr_3$, etc., as described in *Bull. Chem. Soc. Japan*, Vol. 42, page 2924 (1969).

In another embodiment, the halomethyl-1,3,5-triazine is as described in U.S. Pat. No. 4,329,384 (Vesley), and is of the formula:

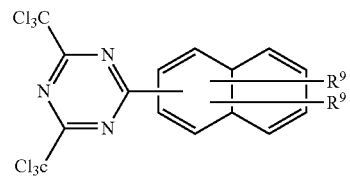

wherein each $R^9$ is independently hydrogen, alkyl, or alkoxy. By this representation, it is meant that $R^9$ groups can be on either of the fused rings. Preferably, any alkyl or alkoxy group of the photoactive s-triazine component has no more than 12 carbon atoms, and no more than two alkyl and alkoxy groups have more than 6 carbon atoms. In certain embodiments, they have no more than 4 carbon atoms, and the alkyl is often methyl or ethyl, and the alkoxy is often methoxy or ethoxy. Adjacent alkoxy substituents may be interconnected to form a ring. The halomethyl triazine component may be prepared by the co-trimerization of a polynuclear nitrile with trichloroacetonitrile in the presence of HCl gas and a Lewis acid such as $AlCl_3$, $AlBr_3$, etc. as described in *Bull. Chem. Soc. Jap.*, Vol. 42, pages 2924-2930 (1969).

Examples of suitable halomethyl-1,3,5-triazines agents include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley).

The halomethyl triazine will crosslink the polymer resulting from polymerization of unreacted solvent monomers, and will further crosslink the high $M_w$ solute polymer. The triazine may further crosslink the low $M_w$ solute polymer, but the degree of crosslinking is a function of the $M_w$, with polymers having $M_w$ below about 200,000 being minimally crosslinked. When using halomethyl triazines, the adhesive polymer may be described as a mixture of the high $M_w$ polymer, the third polymer having a $M_w$ of 100,000 to 1,000,000, and optionally the low $M_w$ polymer are all crosslinked.

As an alternative to the halomethyltriazines, multifunctional acrylates may be used in step c). Multifunctional acrylates are particularly useful for syrup polymerization. As the crosslinking reaction is selective, the multifunctional acrylates will crosslink only the copolymer resulting from the remaining monomers of the second syrup composition, while the first high $M_w$ copolymer, and the second low $M_w$ copolymer remain uncrosslinked.

Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol)di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

Unlike the halomethyl triazine and hydrogen abstraction crosslinking agents, the multifunctional acrylate will not crosslink the high- and low $M_w$ dead polymers of the syrup. The adhesive polymer may be described as a mixture the high $M_w$ polymer, the low $M_w$ polymer the third polymer of intermediate $M_w$, third polymer having a $M_w$ of 100,000 to 1,000,000, wherein only the third polymer is crosslinked.

The crosslinking agent may also include a hydrogen-abstraction type crosslinking agent including a benzophenone photocrosslinking agent, and either an anthraquinone photocrosslinking agent or a thioxanthone photocrosslinking agent or both an anthraquinone photocrosslinking agent and a thioxanthone photocrosslinking agent.

The benzophenone photocrosslinker may be a multi-functional benzophenone of the general formula:

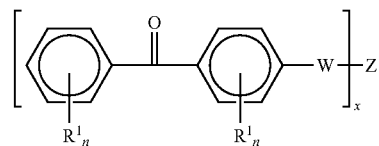

wherein:
W is —O—, —NH—, or —S—;
Z represents (hetero)hydrocarbyl organic spacer group, preferably selected from the group consisting of alkyl, aryl, aralkyl, heteroaryl, and optionally containing ester, amide, urethanes, and urea functional groups.
x is at least 2, preferably 2-6;
each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide,
and n is 0 to 4. In one preferred embodiment, W is —O—; Z is —$(CH_2)_{2-12}$—; and n is 2.

Specific examples of multi-functional benzophenones include 1,5-bis(4-benzoylphenoxy)pentane,1,9-bis(4-benzoylphenoxy)nonane, and 1,11-bis(4-benzoylphenoxy)undecane.

In an alternate embodiment, the benzophenone photocrosslinker is a monobenzophenone of the formula:

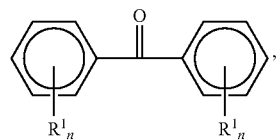

wherein each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide.

Specific examples of monofunctional benzophenones include benzophenone, 4-phenylbenzophenone, 4-methoxybenzophenone, 4,4'-dimethoxybenzophenone, 4,4'-dimethylbenzophenone, 4-methylbenzophenone, 4-(2-hydroxyethylthio)-benzophenone, and 4-(4-tolylthio)-benzophenone.

The anthraquinone photocrosslinker is of the formula

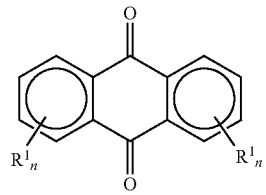

where each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide, and n is 0 to 4.

Representative examples of useful anthraquinone photocrosslinkers include anthraquinone, 2-methyl anthraqinone, 2-t-butyl anthraquinone, 2-ethyl anthraquinone, 2-phenyl anthraquinone, 1,4-dimethyl anthraquinone, 2,3-dimethyl anthraqinone, 1,2-dimethyl anthraqinone, 1-methoxy-2-methyl anthraquinone, 2-acetyl anthraquinone, and 2,6-di-t-butyl anthraquinone.

The thioxanthone photocrosslinker is of the formula:

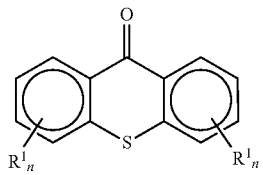

where each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide, and n is 0 to 4.

Representative examples of useful thioxanthone photocrosslinkers include thioxanthone, 2-isopropylthioxanthone, 2-chlorothioxanthone, 2-dodecylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 1-ethoxycarbonyl-3-(1-methyl-1-morpholinoethyl)-thioxanthone, 2-methyl-6-dimethoxymethylthioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 6-ethoxycarbonyl-2-methoxythioxanthone, and 6-ethoxycarbonyl-2-methylthioxanthone. Particularly preferred is 2-isopropylthioxanthone. Other preferred thioxanthones include 1-chloro-4-propoxythioxanthone, 2-propoxythioxanthone, and 4-propoxythioxanthone.

Other useful benzophenone, thioxanthone and anthraquinone chromophores are described in U.S. Pat. No. 6,235,922 (Heilmann et al). The crosslinking of the syrup polymer composition with such crosslinking agents yield a crosslinked adhesive polymer where each of the low $M_w$, the high $M_w$ and the third polymer having a $M_w$ of 100,000 to 1,000,000 are crosslinked.

The amount and identity of the crosslinking agent is tailored depending upon application of the adhesive composition. Typically, the crosslinking agent is present in amounts less than 5 parts based on total dry weight of adhesive composition. More specifically, the crosslinker may be present in amounts from 0.01 to 5 parts, preferably 0.05 to 1 parts, based on 100 parts total monomers used.

The photoinitiator monomers, or polymerizable photoinitiators, include an acryloyl group and a photoinitiator group, which may be a hydrogen-abstracting type or an α-cleavage-type photoinitiator group, and may be represented by the formula:

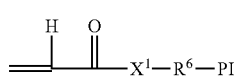

III where;
$X^1$ is —O— or —$NR^3$,
$R^3$ is independently H or $C_1$-$C_4$ alkyl;
$R^6$ is a divalent linking group connecting the acrylate group with the PI group; and PI is a photoinitiator represented by the structure:

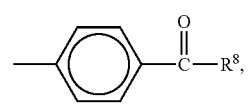

XII wherein $R^8$ is

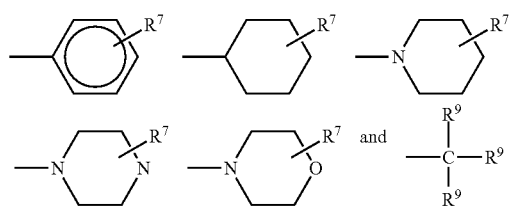

wherein $R^7$ is H or a $C_1$ to $C_4$ alkyl group,
each $R^9$ is independently a hydroxyl group, a phenyl group, a $C_1$ to $C_6$ alkyl group, or a alkoxy group. Such photoinitiator monomers are described, for example, in U.S. Pat. No. 5,902,836 (Babu et al.) and U.S. Pat. No. 5,506,279 (Babu et al.). Further details regarding the linking $R^6$ group may be found with reference to the method of preparing the photoinitiator grafting monomer herein, and in the cited references.

In certain preferred embodiments, the photoinitiator monomers may be of the hydrogen-abstraction type represented by the general formula:

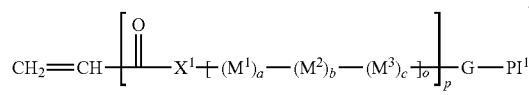

XIII $X^1$ is O or NH;
p is 0 or 1;
o is 0 or an integer from 1 to 5;
a, b, and c are independently 0 or 1;
$M^1$ is $CH_2$ or $Si(R^1)_2$;
$M^2$ is $C(R^1)_2$ or $Si(R^1)_2$;
$M^3$ is —O—, —NH—, —C(O)—, —C(O)O—, —C(O)NH—, or —OC(O)NH—;
Each $R^1$ is independently H or a $C_1$ to $C_4$ alkyl group;
G is a covalent bond, —$(CH_2)_d$—, or —$(CH_2)_d$ O— where d is an integer from 1 to 4, preferably from 1 to 2;
$PI^1$ is a radiation-sensitive hydrogen abstracting group having the general formula:

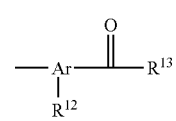

XIV in which Ar is a substituted arene having 6 to 12 carbon atoms, preferably a benzenetriyl group;
$R^{12}$ is hydrogen, a $C_1$ to $C_{12}$ alkyl group, a $C_1$ to $C_{12}$ alkoxy group, or a phenyl group; and $R^{13}$ is a $C_1$ to $C_6$ alkyl group, a cycloalkyl group having 3 to 14 carbon atoms, or

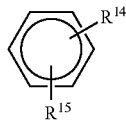

wherein $R^{14}$ and $R^{15}$ are independently selected from hydrogen, $C_1$ to $C_{12}$ alkyl groups, $C_1$ to $C_{12}$ alkoxy groups, and phenyl groups.

Included among those hydrogen abstracting photoinitiator monomers encompassed by Formula XIII are those where $PI^1$ is a moiety derived from one of the following compounds (or a substituted derivative thereof), the bond to G is preferably located para to the bridging carbonyl group: benzopheneone, anthraquinone, 5,12-naphthacenequinone, aceanthracenequinone, benz(A)anthracene-7,12-dione, 1,4-chrysenequinone, 6,13-pentacenequinone, 5,7,12,14-pentacenetetrone, 9-fluorenone, anthrone, xanthone, thioxanthone, acridone, dibenzosuberone, acetophenone, and chromone. The synthesis of the formula XIII monomers is described in U.S. Pat. No. 5,773,485 (Bennett et al).

A preferred photoinitiator monomer is 2-propenoylaminoethanoic acid, 2-(4-(2-hydroxy-2 methylpropanoyl)phenoxy)ethyl ester, "VAZPIA" prepared according to Example 1 of U.S. Pat. No. 5,506,279 (Babu et al.).

The weight percentage of the photoinitiator monomers of Formula XII or XIII in the syrup composition may be at least about 0.1 parts by, and generally less than about 10 parts by weight, relative to the 100 parts total weight of monomers and low $M_w$ solute copolymer.

The photocurable composition comprising the high- and low $M_w$ syrup copolymers, monomers, optional tackifier and crosslinking agent, may be irradiated with activating UV or visible radiation to polymerize the components preferably in the wavelengths of 250 to 500 nanometers. UV light sources can be of two types: 1) relatively low light intensity sources such as blacklights that provide generally 10 mW/cm² or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium- and high-pressure mercury arc lamps, electrodeless mercury lamps, light emitting diodes, mercury-xenon lamps, lasers, LED UV light sources, and the like, which provide intensities generally between 10 and 5000 mW/cm² in the wavelength rages of 320-390 nm (as measured in accordance with procedures approved by the United States National Institute of Standards and Technology as, for example, with a PowerPuck™ radiometer manufactured by Electronic Instrumentation & Technology, Inc., in Sterling, Va.).

The crosslinking or curing of the composition may be conducted in the presence of, or preferably in the absence of, suitable solvents such as ethyl acetate, toluene and tetrahydrofuran, which are unreactive with the functional groups of the components of the syrup composition.

The curable composition may comprise a tackifier. Tackifiers are well known and are used to increase the tack or other properties of an adhesive. There are many different types of tackifiers but nearly any tackifier can be classified as: a rosin resin derived from wood rosin, gum rosin or tall oil rosin; a hydrocarbon resin made from a petroleum-based feedstock; or a terpene (phenol) resin derived from terpene feedstocks of wood or certain fruits. The adhesive layer may comprise, e.g., from 0.01 to about 50 weight percent, from 1 to about 50 weight percent, or from 0.01 to about 10 weight percent of tackifier. The adhesive layer may be free of tackifier.

Further components and additives may be included into the curable composition such as, for example, heat stabilizers, antioxidants, antistatic agents, thickeners, fillers, pigments, dyes, colorants, thixotropic agents, processing aides, nanoparticles, fibers and any combination thereof in amounts such that the optical properties of the adhesive are not significantly compromised. Such additives are generally in an amount of between 0.01 and 10 wt. % and more preferably in an amount of between 0.05 and 5 wt. % with respect to the mass of curable composition. In some embodiment the curable composition and subsequent adhesive contain no such additives.

It is preferable to coat the composition prior to crosslinking. The composition, either neat or solution, are easily coated upon suitable substrates, such as flexible backing materials, by conventional coating techniques, then further polymerized, and cured, to produce adhesive coated sheet materials. The flexible backing material may be any material conventionally utilized as a tape backing, optical film, or any other flexible material.

The radiation-curable precursor comprising the high- and low $M_w$ copolymers, the crosslinking agent and unreacted solvent monomers have a Brookfield viscosity of between 1,000 to 500,000 mPas, preferably of between 2,000 and 125,000 mPas, more preferably between 2,000 to 75,000 and especially preferably of between 2,000 and 50,000 mPas at 20° C. If the radiation-curable composition is applied to a substrate by printing it and preferably has a Brookfield viscosity at 20° C. of between 1,000 and 30,000 mPas and more preferably between 2,000 and 25,000 mPas. If desired, additional monomer may be used to reduce the viscosity.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary. The solutions may be of any desirable concentration, and for subsequent coating, but is typically 20 to 70 weight percent (wt-%) polymer solids, and more typically 30 to 50 wt-% solids, in solvent. In some embodiments the compositions may be coated neat. In some embodiments, multiple layers of the adhesive may be coated on one or more surfaces of a substrate. The desired concentration may be achieved by further dilution of the coating composition, or by partial drying.

Adhesive articles and release articles may be prepared by coating the composition on a suitable support, such as a flexible backing Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like.

Foam backings may be used. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

Commercially available backing materials useful in the disclosure include HOSTAPHAN 3SAB, primed polyester film (available from Mitsubishi Polyester Film Inc., Greer, S.C.), kraft paper (available from Monadnock Paper, Inc.); cellophane (available from Flexel Corp.); spun-bond poly(ethylene) and poly(propylene), such as TYVEK and TYPAR (available from DuPont, Inc.); and porous films obtained from poly(ethylene) and poly(propylene), such as TESLIN (available from PPG Industries, Inc.), and CELLGUARD (available from Hoechst-Celanese). Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

The adhesive resulting from photopolymerization of the curable composition is desirably optically clear rendering them useful on optical applications. As used herein, the term "optically clear" refers to a material that has a luminous transmission of greater than about 90 percent, a haze of less than about 2 percent, and opacity of less than about 1 percent in the 350 to 800 nm wavelength range. Both the luminous transmission and the haze can be determined using, for example, ASTM-D 1003-95. Typically, the optically clear adhesive may be visually free of bubbles.

The adhesive layer desirably maintains optical clarity, bond strength, and resistance to delamination over the lifetime of the article in which it is used. Whether an adhesive will likely have these desirable characteristics can be determined using an accelerated aging test. The adhesive layer can be positioned between two substrates for this test. The resulting laminate is then exposed to elevated temperatures, optionally, combined with elevated humidity conditions, for a period of time. For example, the adhesive layer can often retain its optical clarity after aging at 85° C. for approximately 500 hours without humidity control (i.e., the relative humidity in the oven is usually below about 10 percent or below about 20 percent). Alternatively, the adhesive can often retain its optical clarity after aging at 65° C. for approximately 72 hours with a relative humidity of about 90 percent. Most importantly, the cloud point resistant adhesive can often retain its optical clarity after aging at 65° C. for approximately 72 hours with a relative humidity of about 90 percent and rapid (i.e. within minutes) cooling to ambient conditions. After aging, the average transmission of the adhesive between 350 nanometers (nm) and 800 nm can be greater than about 85 percent and the haze can be less than about 2 percent.

Laminates are provided that include an optical film or optically clear substrate and a optically clear adhesive layer adjacent to at least one major surface of the optical film or substrate. The articles can further include another substrate (e.g., permanently or temporarily attached to the adhesive layer), another adhesive layer, or a combination thereof. As used herein, the term "adjacent" can be used to refer to two layers that are in direct contact or that are separated by one or more thin layers, such as primer or hard coating. Often, adjacent layers are in direct contact. Additionally, laminates are provided that include an adhesive layer positioned between two substrates, wherein at least one of the substrates is an optical film. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Films for the provided laminates can also include retarder plates such as quarter-wave and half-wave phase retardation optical elements. Other optically clear films include antisplinter films and electromagnetic interference filters.

In some embodiments, the resulting laminates can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, cathode ray tubes, and reflectors.

Exemplary optically clear substrates include, but are not limited to a display panel, such as liquid crystal display, an OLED display, a touch panel, electrowetting display or a cathode ray tube, a window or glazing, an optical component such as a reflector, polarizer, diffraction grating, mirror, or cover lens, another film such as a decorative film or another optical film.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes, polypropylenes, and cellulose triacetates. Typically, cover lenses can be made of glass, polymethyl methacrylates, or polycarbonate.

The laminates have at least one of the following properties: the adhesive layer has optical transmissivity over a useful lifetime of the article, the adhesive can maintain sufficient bond strength between layers of the article, the adhesive can resist or avoid delamination, and the adhesive can resist bubbling of the adhesive layer over a useful lifetime. The resistance to bubble formation and retention of optical transmissivity can be evaluated using accelerated aging tests.

The adhesive compositions of the present disclosure may be applied directly to one or both sides of an optical element such as a polarizer. The polarizer may include additional layers such as an anti-glare layer, a protective layer, a reflective layer, a phase retardation layer, a wide-angle compensation layer, and a brightness enhancing layer. In some embodiments, the adhesives of the present disclosure may be applied to one or both sides of a liquid crystal cell. It may also be used to adhere a polarizer to a liquid crystal cell. Yet another exemplary set of optical laminates include the application of a cover lens to a LCD panel, the application of a touch panel to an LCD panel, the application of a cover lens to a touch panel, or combinations thereof.

EXAMPLES

All amounts are stated as weight percent unless otherwise indicated. Compositions listed in "phr" indicated parts per 100 parts of acrylic copolymer components (i.e., the total amount of acrylate monomers). As used herein, the term "polymer" is meant to be inclusive of homopolymers and co-polymers.

TABLE 1

Materials

| Designation | Description and Source |
| --- | --- |
| AA | Acrylic acid; available from Alfa Aesar, Ward Hill, MA |
| Allyl acrylate | Allyl acrylate; available from Sigma-Aldrich Co., St. Louis, MO |
| CHA | Cyclohexyl acrylate; available from Sigma-Aldrich Co., St. Louis, MO |
| 2-EHA | 2-ethylhexyl acrylate; available from BASF, Ludwigshafen, Germany |
| EHMP | Ethylhexyl mercaptopropionate, a chain transfer agent; available from Sigma-Aldrich Co., St. Louis, MO |
| IBoA | isobornyl acrylate, available from Osaka Organic Chemical Industry, Ltd., Osaka, Japan |
| IOA | Isooctyl acrylate; available from 3M Co., St. Paul, MN |
| IOTG | Isooctyl thioglycolate; available from Showa Denko Corp., Tokyo, Japan |
| IRG651 | a photoinitiator; available from BASF, Ludwigshafen, Germany under the trade designation "IRGACURE 651" |
| 2-PHA | 2-propylheptyl acrylate; available from BASF, Ludwigshafen, Germany |
| RR 6108 | Hydrocarbon tackifier resin; available from Eastman Co., Kingsport, TN, under the trade designation "REGALREZ 6108" |
| TH-130 | Polyester tackifier resin; available from Yasuhara Chemical Co., Ltd., Hiroshima, Japan, under the trade designation "YS POLYESTER TH-130" |
| Triazine | 2-(4-Methoxyphenyl)-4,6-bis(trichloromethyl)-1,3,5-triazine, available from TCI America, Portland, OR |
| VAZO 52 | 2,2-azobis(2,4-dimethylvaleronitrile, a polymerization initiator; available from DuPont, Wilmington, DE |

Test Methods
Molecular Weight Measurement

The weight average molecular weight and molecular weight distribution of the polymers were determined using conventional gel permeation chromatography (GPC). The GPC apparatus, Alliance System 2695, obtained from Waters Corporation (Milford, Mass.), included a high pressure liquid chromatography pump (Model 1515HPLC), an auto-sampler (Model 717), a UV detector (Model 2487), and a refractive index detector (Model 2414). The chromatograph was equipped with column sets consisting of three columns: PLGEL 10 um MIXED-B (300 mm×7.5 mm×2 ea), PLGEL 5 um MIXED-D (300 mm×7.5 mm), and PLGEL 10 um guard (50 mm×7.5 mm) available from Varian Inc., Palo Alto, Calif.

Samples for GPC measurement were prepared without adding cross linker. Polymeric solutions for testing were prepared by dissolving a polymer in tetrahydrofuran at a concentration of 0.25% (w/v) by weight and filtering through a 25 mm, 0.45 micrometer pore size polytetrafluoroethylene (PTFE) syringe filter (available from Whatman). About 100 microliters of the resulting solution was injected into the GPC and eluted at a rate of 1 milliliter per minute through the columns maintained at 35° C. The system was calibrated with polystyrene standard ranging in molecular weight from 2,340,000 down to 486 obtained via a log molecular weight versus retention time. The weight average molecular weight (Mw) was calculated for each sample from the calibration curve.

180° Angle Peel Adhesion Strength

The peel adhesion strength of an adhesive at a removal angle of 180° was performed following generally the procedure described in ASTM International standard D3330-04 (2010), Method A.

Adhesive transfer tapes were prepared for testing by laminating the adhesive to 51 micron polyester film backings (HOSTAPHAN 3SAB available from Mitsubishi Polyester Film, Inc., Greer, S.C.) to produce a tape. Tapes were tested on the tape backing A test specimen was prepared by rolling down a 1 in. (~2.5 cm)×5 in. (~12.7 cm) strip of adhesive tape onto a test panel (stainless steel, polycarbonate, acrylonitrile-butadiene-styrene copolymer, polypropylene, or polyethylene, as specified in the Tables below) using 4 passes of a 2.0 kg (4.5 lb.) rubber roller. For conditioned samples, the test specimen was conditioned at 25° C. and 50%±5% relative humidity for 3 days; or at 70° C. and 50%±5% relative humidity for 3 days, as specified in the tables below. The average force, based on 2 replicates, required to peel the tape from the test panel was reported in both kilogram force per inch (kgf/inch) and in Newtons/decimeter (N/dm).

Examples 1 to 18 (EX-1 to EX-18): Preparation of Adhesive Copolymers

First Polymerization Step: Generation of High $M_w$ ("HMW") Pre-Polymer Syrup

In a first step, to make an HMW pre-polymer syrup, a mixture of either IOA:AA (90:10) or IOA:CHA:AA (65:30:5) was partially polymerized according the continuous free radical polymerization method generally described in U.S. Pat. Nos. 4,619,979 and 4,843,134 (Kotnour et al.), using the components as summarized in Table 2 (phr=parts per hundred by weight relative to total weight of acrylic monomers).

TABLE 2

| Syrup | IOA, phr | CHA, phr | AA, phr | IRG651, phr | Weight Average $M_w$ of high $M_w$ copolymer, g/mol | Wt. % of high $M_w$ copolymer in the pre-polymer syrup |
| --- | --- | --- | --- | --- | --- | --- |
| HMW-1 | 90 | 0 | 10 | 0.04 | ~2,000,000 | ~5 to 7 wt. % |
| HMW-2 | 65 | 30 | 5 | 0.04 | ~2,000,000 | ~5 to 7 wt. % |

Second Polymerization Step: Generation of Low $M_w$ Polymer Species in HMW Pre-Polymer Syrup In a second polymerization step, a high molecular weight pre-polymer syrup of the first step was combined with EHMP (a chain transfer agent), more IRG561 initiator, and then was UV polymerized according to an adiabatic polymerization method using a batch reactor, as generally described in U.S. Pat. No. 5,637,646 (Ellis), using the components as summarized in Table 3.

TABLE 3

| Sample | Pre-polymer Syrup | Additional IRG651, phr | EHMP added, phr | $M_w$ of LMW polymer produced, g/mol | LMW polymer, phr | Residual EHMP, phr | Allyl acrylate, phr | Triazine, phr |
|---|---|---|---|---|---|---|---|---|
| CE-1 | HMW-1 | 0.1 | 0 | NA | NA | 0 | 0 | 0.1 |
| EX-1 | HMW-1 | 0.1 | 0.4 | 197,000 | 10 | 0.0248 | 0.0124 | 0.1 |
| EX-2 | HMW-1 | 0.1 | 0.2 | 79,000 | 10 | 0.0521 | 0.0261 | 0.1 |
| EX-3 | HMW-1 | 0.1 | 0.1 | 42,000 | 10 | 0.0960 | 0.0480 | 0.1 |
| CE-2 | HMW-1 | 0.1 | 0 | NA | NA | 0 | 0 | 0.1 |
| EX-4 | HMW-1 | 0.1 | 0.4 | 197,000 | 15 | 0.0389 | 0.0194 | 0.1 |
| EX-5 | HMW-1 | 0.1 | 0.2 | 79,000 | 15 | 0.0676 | 0.0338 | 0.1 |
| EX-6 | HMW-1 | 0.1 | 0.1 | 42,000 | 15 | 0.1452 | 0.0726 | 0.1 |
| CE-3 | HMW-1 | 0.1 | 0 | NA | NA | 0 | 0 | 0.1 |
| EX-7 | HMW-1 | 0.1 | 0.4 | 197,000 | 20 | 0.0527 | 0.0264 | 0.1 |
| EX-8 | HMW-1 | 0.1 | 0.2 | 79,000 | 20 | 0.0821 | 0.0411 | 0.1 |
| EX-9 | HMW-1 | 0.1 | 0.1 | 42,000 | 20 | 0.1987 | 0.0994 | 0.1 |
| CE-4 | HMW-2 | 0.1 | 0 | NA | NA | 0 | 0 | 0.1 |
| EX-10 | HMW-2 | 0.1 | 0.4 | 197,000 | 15 | 0.032 | 0.016 | 0.1 |
| EX-11 | HMW-2 | 0.1 | 0.2 | 79,000 | 15 | 0.066 | 0.033 | 0.1 |
| EX-12 | HMW-2 | 0.1 | 0.1 | 42,000 | 15 | 0.138 | 0.069 | 0.1 |
| CE-5 | HMW-2 | 0.1 | 0 | NA | NA | 0 | 0 | 0.15 |
| EX-13 | HMW-2 | 0.1 | 0.4 | 197,000 | 15 | 0.034 | 0.17 | 0.15 |
| EX-14 | HMW-2 | 0.1 | 0.2 | 79,000 | 15 | 0.067 | 0.034 | 0.15 |
| EX-15 | HMW-2 | 0.1 | 0.1 | 42,000 | 15 | 0.130 | 0.065 | 0.15 |
| CE-6 | HMW-2 | 0.1 | 0 | NA | NA | 0 | 0 | 0.2 |
| EX-16 | HMW-2 | 0.1 | 0.4 | 197,000 | 15 | 0.034 | 0.17 | 0.2 |
| EX-17 | HMW-2 | 0.1 | 0.2 | 79,000 | 15 | 0.067 | 0.034 | 0.2 |
| EX-18 | HMW-2 | 0.1 | 0.1 | 42,000 | 15 | 0.130 | 0.065 | 0.2 |

NA = not applicable

In Table 3, HMW syrup without chain transfer agent (i.e., HMW-1 or HMW-2) was added to dilute the amount of LWM polymer to 10 phr, 15 phr, or 20 phr as indicated, and other ingredients including additional photoinitiator (i.e., IRG651) and crosslinker (i.e., allyl acrylate) were then added. "Residual EHMP" refers to the amount of EHMP remaining after the second polymerization step.

Samples were prepared as in steps 1 and 2 above to provide samples from HMW-1 (i.e., from IOA:AA=90:10, by weight) and having 15% w/w of low MW species (i.e., corresponding to EX-4, EX-5, and EX-6 in Table 3, but in these samples having weight average MW values of 150,000, 80,000, and 40,000 g/mole, respectively). The samples were tested for 180° peel adhesion values to stainless steel, reported in Table 4 as both kilogram force per inch (kgf/inch) and as Newtons per decimeter (N/dm). Initial 180° peel adhesion values were obtained, as well as 180° peel adhesion values after 3 days at room temperature ("3D RT") and after 3 days at 70° C. ("3D 70° C.").

TABLE 4

| Sample having 15% w/w of low MW species | Initial 180° Peel Adhesion Value, kgf/inch (N/dm) | 180° Peel Adhesion Value, 3D RT, kgf/inch (N/dm) | 180° Peel Adhesion Value, 3D 70° C., kgf/inch (N/dm) |
|---|---|---|---|
| Control: no low MW species | 1.1 (42) | 2.0 (77) | 1.6 (62) |
| Low MW species = 150,000 g/mole (weight average) | 1.15 (44) | 1.7 (65) | 1.9 (72) |
| Low MW = 80,000 (weight average) | 1.3 (50) | 1.8 (71) | 2.0 (76) |
| Low MW = 40,000 (weight average) | 1.4 (54) | 2.0 (79) | 2.1 (82) |

Samples were prepared as in steps 1 and 2 above to provide samples from HMW-1 (i.e., from IOA:AA=90:10, by weight) and having a low MW species having a weight average MW=40,000 and an amount of low MW species of 0% w/w, 10% w/w, 15% w/w, or 20% w/w of the low MW species (i.e., corresponding to EX-3, EX-6, and EX-9 in Table 3, but having a weight average molecular weight of 40,000). The samples were tested for 180° peel adhesion values to stainless steel, reported in Table 5 as both kilogram force per inch (kgf/inch) and as Newtons per decimeter (N/dm). Initial 180° peel adhesion values were obtained, as well as 180° peel adhesion values after 3 days at room temperature ("3D RT") and after 3 days at 70° C. ("3D 70° C.").

TABLE 5

| Sample, % w/w of Low MW species | Initial 180° Peel Adhesion Value, kgf/inch (N/dm) | 180° Peel Adhesion Value, 3D RT, kgf/inch (N/dm) | 180° Peel Adhesion Value, 3D 70° C., kgf/inch (N/dm) |
|---|---|---|---|
| 0% w/w low MW species | 1.1 (43) | 1.8 (70) | 1.3 (49) |
| 10% w/w low MW species | 1.2 (47) | 2.2 (84) | 2.0 (77) |
| 15% w/w low MW species | 1.4 (54) | 2.0 (79) | 2.1 (82) |
| 20% w/w low MW species | 1.3 (51) | 2.2 (83) | 2.0 (76) |

Samples of CE-4 and EX-10 to EX-12 (prepared as above from HMW-2, i.e., from IOA:CHA:AA=65:30:5, by weight) were tested for 180° peel adhesion values to stainless steel (SS), polycarbonate (PC), or an acrylonitrile-butadiene-styrene copolymer (ABS). The adhesion values were as reported in Table 6, listed as kilogram force per inch (kgf/inch) and as Newtons per decimeter (N/dm). Initial 180° peel adhesion values were obtained, as well as 180° peel adhesion values after 3 days at room temperature ("3D RT").

TABLE 6

| Sample | Substrate | Initial 180° Peel Adhesion Value, kgf/inch (N/dm) | 180° Peel Adhesion Value, 3D RT, kgf/inch (N/dm) |
|---|---|---|---|
| CE-4 | SS | 1.2 (45) | 1.7 (64) |
| CE-4 | PC | 1.1 (44) | 1.3 (51) |
| CE-4 | ABS | 0.95 (37) | 1.1 (42) |
| EX-10 | SS | 1.3 (48) | 1.6 (60) |
| EX-10 | PC | 1.3 (51) | 1.5 (59) |
| EX-10 | ABS | 1.0 (39) | 1.2 (45) |
| EX-11 | SS | 1.4 (53) | 1.7 (67) |
| EX-11 | PC | 1.3 (51) | 1.5 (59) |
| EX-11 | ABS | 1.0 (40) | 1.4 (53) |
| EX-12 | SS | 1.5 (58) | 2.4 (93) |
| EX-12 | PC | 1.5 (59) | 1.6 (63) |
| EX-12 | ABS | 1.1 (41) | 1.3 (50) |

Additional examples of syrups and adhesive copolymers of the present disclosure were prepared as follows. In a first polymerization step similar to the preparation of the high MW syrups HMW-1 and HMW-2 (refer to Table 2 and its description above), additional high MW syrups HMW-3, HMW-4, and HMW-5 were prepared from mixtures of IOA:IBoA:AA in the weight ratios listed in Table 7.

TABLE 7

| Syrup | IOA, phr | IBoA, phr | AA, phr | IRG651, phr | Weight Average Mw of high Mw copolymer, g/mol | Wt. % of high Mw copolymer in the pre-polymer syrup |
|---|---|---|---|---|---|---|
| HMW-3 | 82.5 | 16.7 | 0.8 | 0.04 | ~2,000,000 | ~5 to 7 wt. % |
| HMW-4 | 85 | 13 | 2 | 0.04 | ~2,000,000 | ~5 to 7 wt. % |
| HMW-5 | 83 | 13 | 4 | 0.04 | ~2,000,000 | ~5 to 7 wt. % |

In a second polymerization step, similar to the second polymerization step described for the samples in Table 3 above, the syrups HMW-3, HMW-4, and HMW-5 from Table 7 were UV polymerized according to an adiabatic polymerization method to provide the adhesive copolymers listed in Table 8. Notably, a tackifier material was also included (i.e., one of RR 6108 or TH-130).

TABLE 8

| Sample | Pre-polymer Syrup | Additional IRG651, phr | EHMP added, phr | Mw of LMW polymer produced, g/mol | LMW polymer, phr | RR 6108, phr | TH-130, phr | Triazine, phr |
|---|---|---|---|---|---|---|---|---|
| CE-7 | HMW-3 | 0.1 | 0 | NA | NA | 24 | 0 | 0.14 |
| EX-19 | HMW-4 | 0.1 | 0.4 | 197,000 | 5 | 0 | 20 | 0.2 |
| EX-20 | HMW-4 | 0.1 | 0.2 | 79,000 | 10 | 0 | 20 | 0.2 |
| EX-21 | HMW-4 | 0.1 | 0.1 | 42,000 | 15 | 0 | 20 | 0.2 |
| CE-8 | HMW-5 | 0.1 | 0 | NA | NA | 12 | 0 | 0.17 |

NA = not applicable

Samples of CE-7, CE-8, and EX-19 to EX-21 were tested for 180° peel adhesion values to stainless steel (SS), polycarbonate (PC), acrylonitrile-butadiene-styrene copolymer (ABS), polypropylene (PP) or polyethylene (PE). The adhesion values were as reported in Table 9, listed as kilogram force per inch (kgf/inch) and as Newtons per decimeter (N/dm). Initial 180° peel adhesion values were obtained, as well as 180° peel adhesion values after 3 days at room temperature ("3D RT").

TABLE 9

| Sample | Substrate | Initial 180° Peel Adhesion Value, kgf/inch (N/dm) | 180° Peel Adhesion Value, 3D RT, kgf/inch (N/dm) |
|---|---|---|---|
| CE-7 | SS | 1.4 (54) | 1.5 (59) |
| CE-7 | PC | 1.5 (59) | 1.6 (61) |
| CE-7 | ABS | 1.6 (63) | 1.6 (60) |
| CE-7 | PP | 1.5 (57) | 2.0 (78) |
| CE-7 | PE | 0.63 (24) | 0.65 (25) |
| EX-19 | SS | 1.8 (69) | 1.9 (75) |
| EX-19 | PC | 1.5 (58) | 1.6 (64) |
| EX-19 | ABS | 1.5 (57) | 1.5 (58) |
| EX-19 | PP | 1.1 (43) | 1.5 (57) |
| EX-19 | PE | 0.53 (20) | 0.58 (22) |
| EX-20 | SS | 1.9 (72) | 2.1 (81) |
| EX-20 | PC | 1.8 (70) | 1.9 (74) |
| EX-20 | ABS | 1.6 (61) | 1.5 (57) |
| EX-20 | PP | 1.3 (52) | 1.4 (54) |
| EX-20 | PE | 0.59 (23) | 0.50 (19) |
| EX-21 | SS | 2.2 (84) | 2.9 (111) |
| EX-21 | PC | 2.0 (76) | 2.3 (91) |
| EX-21 | ABS | 1.6 (61) | 1.6 (62) |
| EX-21 | PP | 1.6 (60) | 1.6 (60) |

TABLE 9-continued

| Sample | Substrate | Initial 180° Peel Adhesion Value, kgf/inch (N/dm) | 180° Peel Adhesion Value, 3D RT, kgf/inch (N/dm) |
|---|---|---|---|
| EX-21 | PE | 0.80 (31) | 0.65 (25) |
| CE-8 | SS | 2.1 (82) | 2.7 (103) |
| CE-8 | PC | 1.8 (69) | 1.9 (75) |
| CE-8 | ABS | 1.8 (71) | 1.7 (67) |
| CE-8 | PP | 1.3 (50) | 1.8 (68) |
| CE-8 | PE | 0.48 (19) | 0.49 (19) |

1. A method of preparing an acrylic adhesive copolymer comprising the steps of:
 a) partially polymerizing a (meth)acrylate monomer mixture to a conversion of 0.1 to 25% to produce a first syrup copolymer comprising a high $M_w$ solute copolymer having a $M_w$ of 300,000 to 3,000,000, and unreacted solvent monomer,
 b) add a chain transfer agent and an initiator to the first syrup and partially polymerizing to produce a second syrup polymer comprising the high $M_w$ solute copolymer, a low $M_w$ solute copolymer having a $M_w$ of 300-300,000, and unreacted solvent monomer;
 c) quench the chain transfer agent, and add a crosslinking agent, a photoinitiator and an optional tackifier and photopolymerizing the mixture to produce an adhesive copolymer.

2. The method of embodiment 1 where step a) comprises partially polymerizing to a degree of conversion of 1 to 10%.

3. The method of any of embodiments 1 and 2 where step b) comprises partially polymerizing to a degree of conversion of 5 to 40%.

4. The method of embodiment 3 wherein said initiator of step b) is a thermal initiator.

5. The method of embodiment 3 wherein said initiator of step b) is a photoinitiator.

6. The method of any of the previous embodiments wherein said crosslinking agent is a multifunctional acrylate.

7. The method of any of embodiments 1-5 wherein the crosslinking agent is a halotriazine.

8. The method of any of the previous embodiments wherein the (meth)acrylate monomer mixture comprises:
 a) 50-99.9 parts by weight of (meth)acrylate ester monomers;
 b) 0.1-15 parts by weight of acrylic acid monomers;
 c) 0 to 50 parts by weight of (other) polar monomers.

9. The method of any of the previous embodiments wherein the crosslinking agent is in amounts of 0.05 to 1 parts by weight relative to 100 parts by weight of unreacted monomers.

10. The method of any of the previous embodiments wherein the adhesive copolymer of step c) comprises a high $M_w$ copolymer, a low $M_w$ copolymer, and a crosslinked acrylate copolymer.

11. The method of embodiment 1, step a) wherein said partially polymerization is thermal polymerization.

12. The method of embodiment 1 step a) wherein said partially polymerization is photopolymerization.

13. The method of any of the previous embodiments wherein the crosslinking agent is a hydrogen-abstraction type crosslinking agent.

14. The method of any of the previous embodiments wherein the adhesive copolymer product of step c) comprises 5-20 wt % of a high $M_w$ copolymer, 5-30 wt. % of a low $M_w$ copolymer, and a 50-90 wt. % of crosslinked acrylate copolymer.

15. The method of any of the previous embodiments wherein polymerization step b) is an adiabatic polymerization.

16. The method of any of the previous embodiments wherein the crosslinking agent comprises a polymerizable hydrogen-abstraction type photocrosslinking agent.

17. An adhesive composition prepared by the method of any of embodiments 1-16.

18. An adhesive article comprising a layer of the adhesive composition of embodiment 17 on a backing.

What is claimed is:

1. A method of preparing an acrylic adhesive copolymer comprising the steps of:
 a) partially polymerizing a (meth)acrylate monomer mixture to a conversion of 0.1 to 25% to produce a first syrup copolymer comprising a high $M_w$ solute copolymer having a $M_w$ of 300,000 to 3,000,000, and unreacted solvent monomer,
 b) add a chain transfer agent and an initiator to the first syrup and partially polymerizing to produce a second syrup polymer comprising the high $M_w$ solute copolymer, a low $M_w$ solute copolymer having a $M_w$ of 300-300,000, and unreacted solvent monomer;
 c) quench the chain transfer agent, and add a crosslinking agent, a photoinitiator and an optional tackifier and photopolymerizing the mixture to produce an adhesive copolymer.

2. The method of claim 1 where step a) comprises partially polymerizing to a degree of conversion of 1 to 10%.

3. The method of claim 1 where step b) comprises partially polymerizing to a degree of conversion of 5 to 40%.

4. The method of claim 3 wherein said initiator of step b) is a thermal initiator.

5. The method of claim 3 wherein said initiator of step b) is a photoinitiator.

6. The method of claim 1 wherein said crosslinking agent is a multifunctional acrylate.

7. The method of claim 1 wherein the crosslinking agent is a halotriazine.

8. The method of claim 1 wherein the (meth)acrylate monomer mixture comprises:
 a) 50-99.9 parts by weight of (meth)acrylate ester monomers;
 b) 0.1-15 parts by weight of acrylic acid monomers;
 c) 0 to 50 parts by weight of (other) polar monomers.

9. The method of claim 1 wherein the crosslinking agent is in amounts of 0.05 to 1 parts by weight relative to 100 parts by weight of unreacted monomers.

10. The method of claim 1 wherein the adhesive copolymer of step c) comprises a high $M_w$ copolymer, a low $M_w$ copolymer, and a crosslinked acrylate copolymer.

11. The method of claim 1 step a) wherein said partially polymerization is thermal polymerization.

12. The method of claim 1 step a) wherein said partially polymerization is photopolymerization.

13. The method of claim 1 wherein the crosslinking agent is a hydrogen-abstraction type crosslinking agent.

14. The method of claim 1 wherein the adhesive copolymer product of step c) comprises 5-20 wt % of a high $M_w$ copolymer, 5-30 wt. % of a low $M_w$ copolymer, and a 50-90 wt. % of crosslinked acrylate copolymer.

15. The method of claim 1 wherein polymerization step b) is an adiabatic polymerization.

16. The method of claim 1 wherein the crosslinking agent comprises a polymerizable hydrogen-abstraction type photocrosslinking agent.

17. An adhesive composition prepared by the method of claim 1.

18. An adhesive article comprising a layer of the adhesive composition of claim 17 on a backing.

19. The adhesive article of claim 18 comprising a foam backing.

\* \* \* \* \*